United States Patent
Gerber et al.

(10) Patent No.: US 12,241,513 B2
(45) Date of Patent: Mar. 4, 2025

(54) ELECTRIC BRAKE FOR VEHICLE

(71) Applicant: ZF Active Safety US Inc., Livonia, MI (US)

(72) Inventors: Kraig Gerber, Plymouth Township, MI (US); Galus Chelaidite, South Lyon, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 422 days.

(21) Appl. No.: 17/543,031

(22) Filed: Dec. 6, 2021

(65) Prior Publication Data
US 2023/0175564 A1      Jun. 8, 2023

(51) Int. Cl.
| | | |
|---|---|---|
| *F16D 65/18* | (2006.01) | |
| *B60T 8/1755* | (2006.01) | |
| *B60T 8/1761* | (2006.01) | |
| *B60T 13/74* | (2006.01) | |
| *F16D 121/24* | (2012.01) | |

(Continued)

(52) U.S. Cl.
CPC .......... *F16D 65/18* (2013.01); *B60T 8/17613* (2013.01); *B60T 13/741* (2013.01); *B60T 13/746* (2013.01); *B60T 8/1755* (2013.01); *F16D 2121/24* (2013.01); *F16D 2125/40* (2013.01); *F16D 2125/50* (2013.01)

(58) Field of Classification Search
CPC ........ F16D 65/18; F16D 55/22; F16D 55/226; F16D 2121/24; F16D 2125/40; B60T 8/17613; B60T 8/1755; B60T 13/741; B60T 13/746
See application file for complete search history.

(56) References Cited

U.S. PATENT DOCUMENTS 4,809,824 A * 3/1989 Fargier .................. B60T 13/741
                                                                188/106 P
6,340,077 B1 * 1/2002 Schaffer ................ B60T 13/741
                                                                188/71.7

(Continued)

FOREIGN PATENT DOCUMENTS

| DE | 4312524 A1 * | 10/1994 | ............ B60T 13/741 |
|---|---|---|---|
| DE | 10014993 A1 | 9/2001 | |
| DE | 102011004804 A1 | 8/2012 | |

OTHER PUBLICATIONS

DE-4312524-A1 (Year: 1994).*

(Continued)

*Primary Examiner* — Thomas J Williams
(74) *Attorney, Agent, or Firm* — Tarolli, Sundheim, Covell & Tummino LLP

(57) ABSTRACT

An electric brake for a wheel rotor having a brake pad includes a housing with a passage. A piston assembly in the passage includes a spindle and a piston. The spindle is rotatable to cause the piston to move axially relative to the brake pad. A drive assembly includes a motor. A gear train is connected to the motor and the spindle. A coupling mechanism is coupled to the gear train and has a first condition enabling torque transmission from the motor to the spindle to axially move the piston to apply braking force to the brake pad. The coupling mechanism has a second condition disabling torque transmission from the motor to the spindle is prevented which permits the piston to retract and reduce the braking force on the brake pad without stopping or reversing the motor.

23 Claims, 11 Drawing Sheets

(51) Int. Cl.
*F16D 125/40* (2012.01)
*F16D 125/50* (2012.01)

(56) References Cited

U.S. PATENT DOCUMENTS

| | | | |
|---|---|---|---|
| 6,938,735 B1 * | 9/2005 | Hilzinger | F16D 65/18 |
| | | | 188/162 |
| 9,624,994 B2 | 4/2017 | Yasui et al. | |
| 10,184,536 B2 | 1/2019 | Chelaidite et al. | |
| 2016/0032994 A1 * | 2/2016 | Sakashita | F16D 55/225 |
| | | | 188/72.3 |
| 2019/0331180 A1 | 10/2019 | Chelaidite | |
| 2021/0164529 A1 * | 6/2021 | Henning | B60T 13/741 |
| 2023/0175564 A1 * | 6/2023 | Gerber | B60T 13/741 |
| | | | 188/72.1 |

OTHER PUBLICATIONS

German Search Report with a mailing date of Aug. 16, 2023 for applicant ZF Active Safety US Inc., with regard to application 102022212923.7. English translation not provided.

* cited by examiner

ELECTRIC BRAKE FOR VEHICLE

TECHNICAL FIELD

The present invention relates to braking systems and, in particular, relates to an electric brake having a mechanism for selectively decoupling a motor from a rotatable spindle.

BACKGROUND

Current vehicles are equipped with electric motor service brakes for helping control vehicle braking depending on predetermined scenarios. The service brakes rely on one or more movable pistons that selectively apply force to brake pads in order to slow down or stop rotating wheel rotors on the vehicle. The electric motor direction of rotation can be reversed to release or reduce braking in emergency scenarios or drive-away conditions from a standstill on a hill.

SUMMARY

In one example, an electric brake for a wheel rotor having a brake pad includes a housing with a passage. A piston assembly provided in the passage includes a spindle and a piston. The spindle is rotatable to cause the piston to move axially relative to the brake pad. A drive assembly includes a motor. A gear train is connected to the motor and the spindle. A coupling mechanism is coupled to the gear train and has a first condition enabling torque transmission from the motor to the spindle to axially move the piston to apply braking force to the brake pad. The coupling mechanism has a second condition disabling torque transmission from the motor to the spindle which permits the piston to retract and reduce the braking force on the brake pad without stopping or reversing the motor.

In another example, an electric brake for a wheel rotor having a brake pad includes a housing with a passage. A piston assembly provided in the passage includes a spindle and a piston. The spindle is rotatable to cause the piston to move axially relative to the brake pad. A drive assembly includes a motor. Helical and planetary gear stages connect the motor to the spindle. A solenoid brake keyed to a shaft coupled to one of the planetary gear stages has a first condition preventing rotation of the shaft which enables torque transmission from the motor to the spindle to axially move the piston to apply braking force to the brake pad. The solenoid brake has a second condition permitting rotation of the shaft which disables torque transmission from the motor to the spindle to permit the piston to retract and reduce the braking force on the brake pad.

In another example, a method of applying an electric brake to a wheel rotor having a brake pad includes providing a housing having a movable piston assembly therein. The piston assembly includes a spindle and a piston aligned with the brake pad. The spindle is rotatable to cause the piston to move axially relative to the brake pad. A motor is rotated to supply torque to the spindle to axially move the piston to apply braking force to the brake pad. A coupling mechanism connected to the motor is actuated to disable torque transmission from the motor to the spindle which permits the piston to retract and reduce the braking force on the brake pad without stopping or reversing the motor.

Other objects and advantages and a fuller understanding of the invention will be had from the following detailed description and the accompanying drawings.

DETAILED DESCRIPTION

Figure 1:
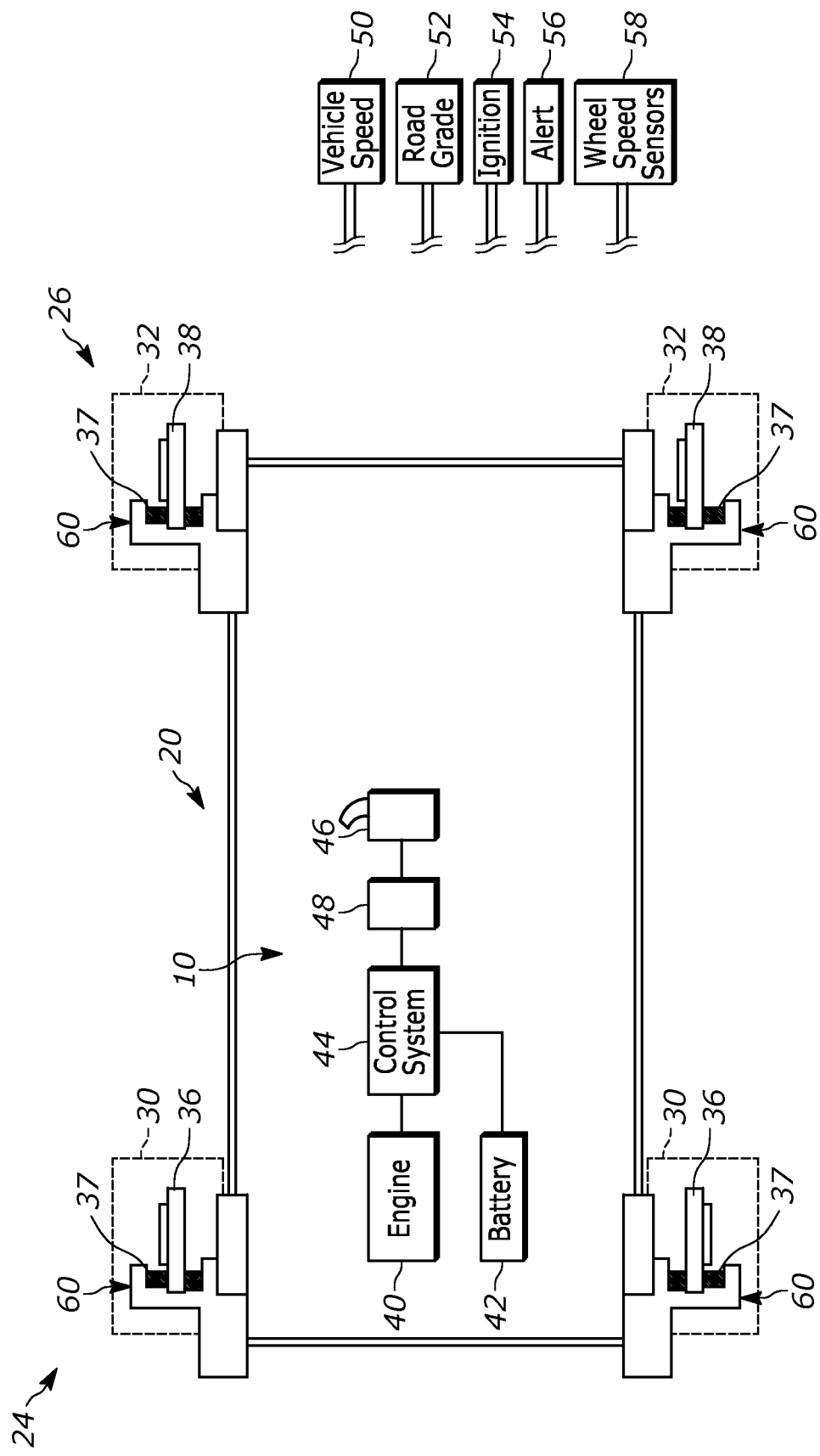
FIG. 1 is a schematic illustration of a vehicle having a braking system.

The present invention relates to braking systems and, in particular, relates to an electric brake having a mechanism for selectively decoupling a motor from a rotatable spindle. FIG. 1 illustrates an example braking system 10 for a motor vehicle 20 in accordance with the present invention. The vehicle 20 can be an electric or hybrid vehicle.

The vehicle 20 extends from a first or front end 24 to a second or rear end 26. A pair of steerable wheels 30 is provided at the front end 24. Each wheel 30 includes a wheel rotor 36 driven and steered by a steering linkage (not shown). A pair of steerable or non-steerable wheels 32 is provided at the rear end 26. Each wheel 32 includes a wheel rotor 38 driven by a steering linkage (not shown). Friction brake pads 37 are associated with each wheel rotor 36, 38 and positioned on opposite sides thereof.

A propulsion system 40 including an engine and/or electric motor supplies torque to the wheels 30. A battery 42 supplies power to the vehicle 20. A brake pedal simulator 46 or brake pedal (not shown) is provided for controlling the timing and degree of vehicle 20 braking. A sensor 48 is connected to the brake pedal simulator 46 and monitors the displacement and acceleration of the brake pedal simulator.

A caliper or caliper assembly 60 is provided on at least one of the wheel rotors 36, 38 and controls both service braking and the parking brake associated with that wheel rotor. As shown, each wheel rotor 36, 38 on the front and rear ends 24, 26 includes a caliper assembly 60. In any case, the caliper assembly 60 is an electromechanical brake and therefore does not rely on or require hydraulic fluid to operate.

A control system 44 is provided to help control operation of the vehicle 20, such as operation of the propulsion system 40 and vehicle braking, including operation of the caliper assemblies 60. To this end, the control system 44 can include one or more controllers, such as a transmission controller, propulsion system controller, motor controller, and/or brake controller. That said, the control system 44 is connected to and receives signals from various sensors that monitor vehicle functions and environmental conditions.

For example, a vehicle speed/acceleration sensor 50 monitors the vehicle speed and acceleration and generates signals indicative thereof. A road grade sensor 52 can detect or calculate the slope of the road on which the vehicle 20 is driving and generate signals indicative thereof. An ignition sensor 54 generates signals indicative of ignition status. A wheel speed sensor 58 is provided on/adjacent to each wheel 32 and generates signals indicative of the speed at each wheel.

The control system 44 can receive and interpret these signals and perform vehicle functions, e.g., braking, in response thereto. In one example, the control system 44 can detect wheel slip between one or more wheels 32 and the driving surface based on the sensors 50, 58 and perform anti-lock braking (ABS) and/or electronic stability control (ESC) using one or more caliper assemblies 60. The control system 44 can also be connected to an alert 56 for notifying the driver/operator of the vehicle 20 of vehicle conditions, vehicle status, braking operations, and/or environmental conditions.

Figure 2:
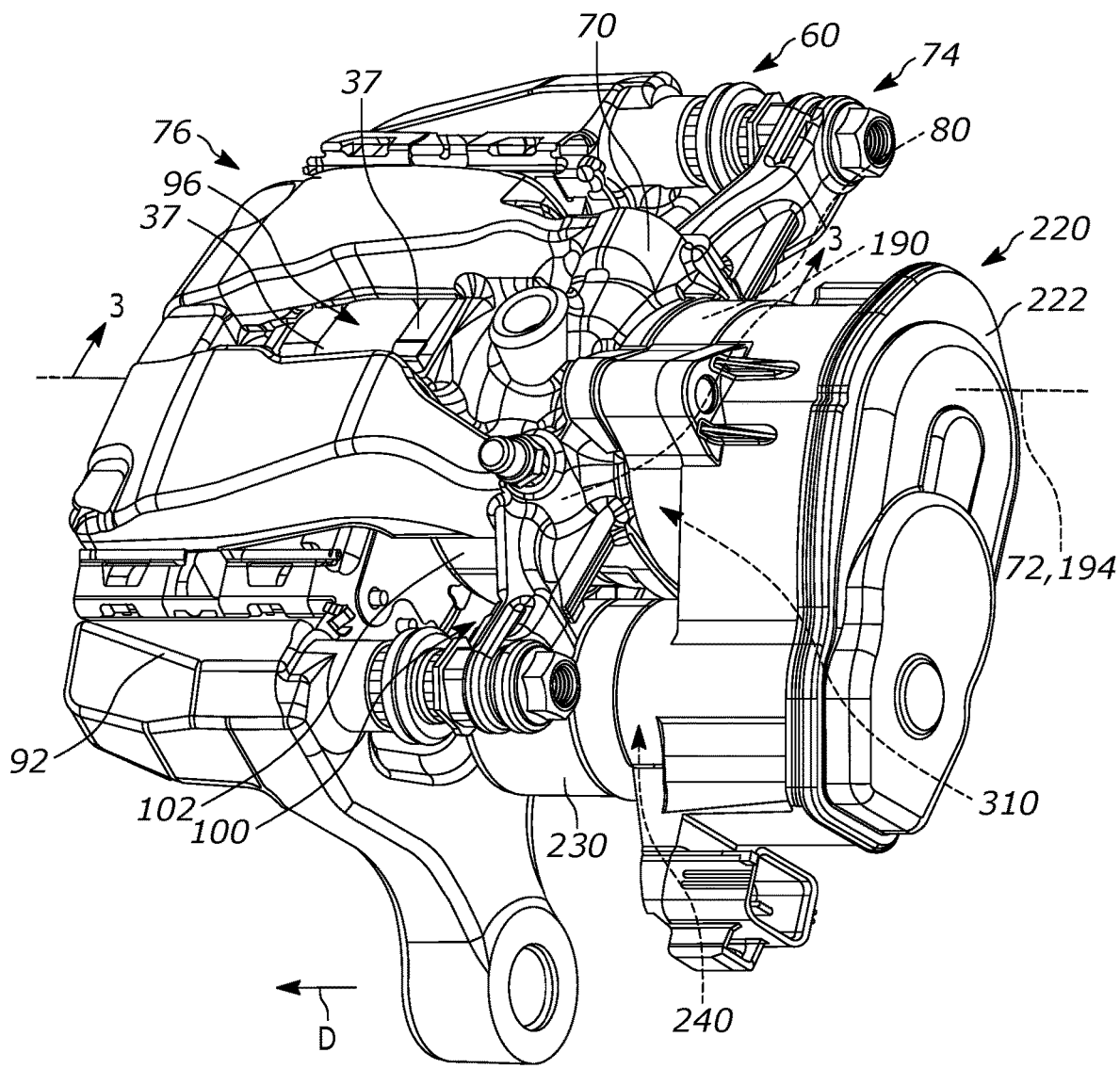
FIG. 2 is a perspective view of an example caliper for the braking system of FIG. 1.

Referring to FIG. 2, the caliper assembly 60 includes a housing 70 and a drive assembly or actuator 220 provided in a housing 222 connected to the housing 70. The housing 70 extends generally along a centerline 72 from a first end 74 to a second end 76. A bore or passage 80 extends into the housing 70 and along the centerline 72 (see FIG. 3A).

A bridge 92 extends from the second end 76 of the housing 70 and along/parallel to the centerline 72. The bridge 92 defines a channel 96 for receiving the rotor 36 or 38 of one of the wheels 30 or 32. The brake pads 37 are directly or indirectly connected to the housing 70 within the channel 96 and positioned on opposite sides of the rotor 36 or 38 (not shown in FIG. 2).

A piston assembly 100 is provided in the passage 80. As shown, the piston assembly 100 includes a piston 102 and a spindle assembly 190 that cooperate to apply braking force to the brake pads 37 in a known, mechanically high-efficiency manner. More specifically, the piston assembly 100 can be configured in any manner such that rotational movement of the spindle assembly 190 results in axial movement of the piston 102 relative to the brake pad 37. To this end, the piston assembly 100 can be configured as a roller screw, a ball nut assembly, a ball ramp assembly or any high efficiency mechanical assembly capable of converting rotary motion to linear motion. Examples of ball nut and ball ramp assemblies can be found in U.S. Pat. No. 10,184,536 and U.S. Patent Publication No. 2019/0331180, the entirety of which are incorporated herein by reference.

Figure 3A:
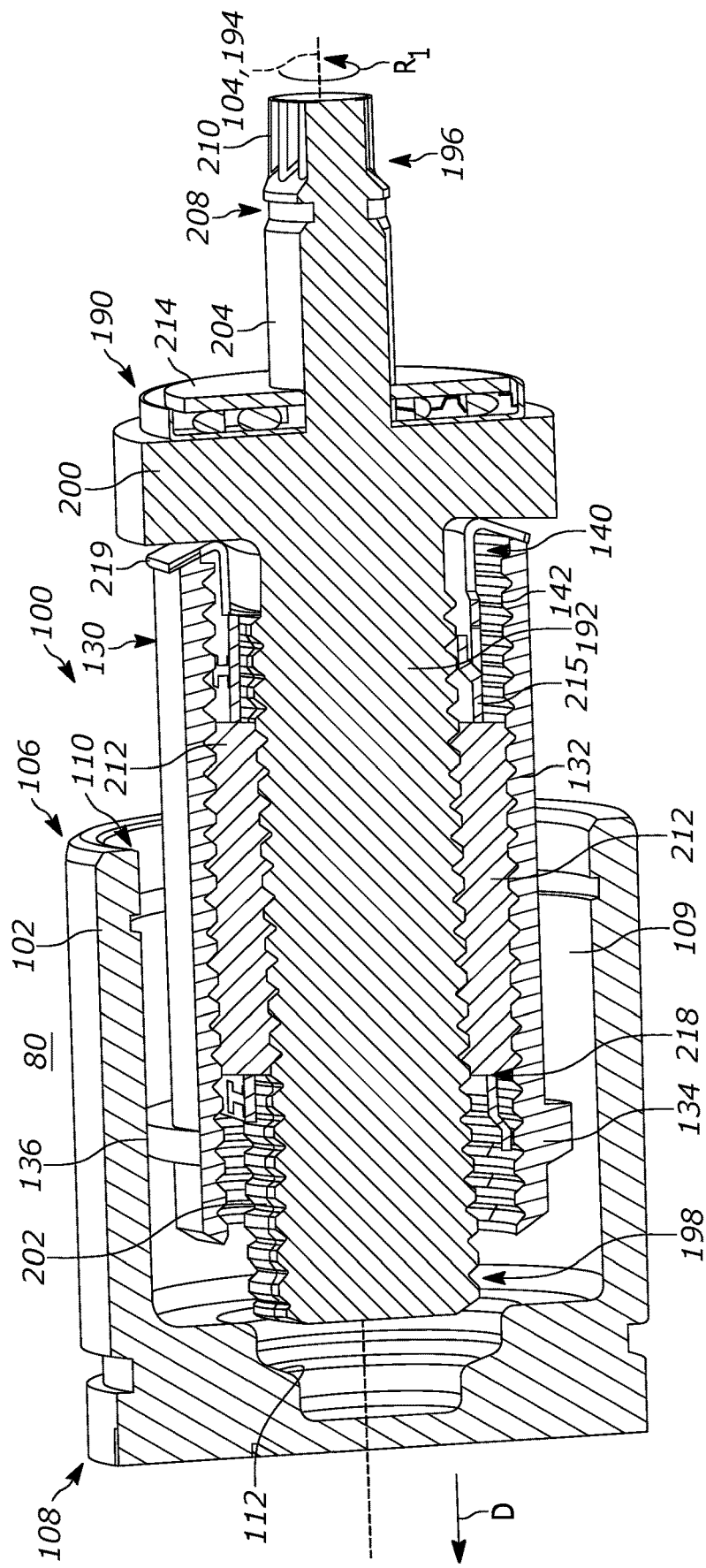
FIG. 3A is a section view of an example piston assembly.
Figure 3B:
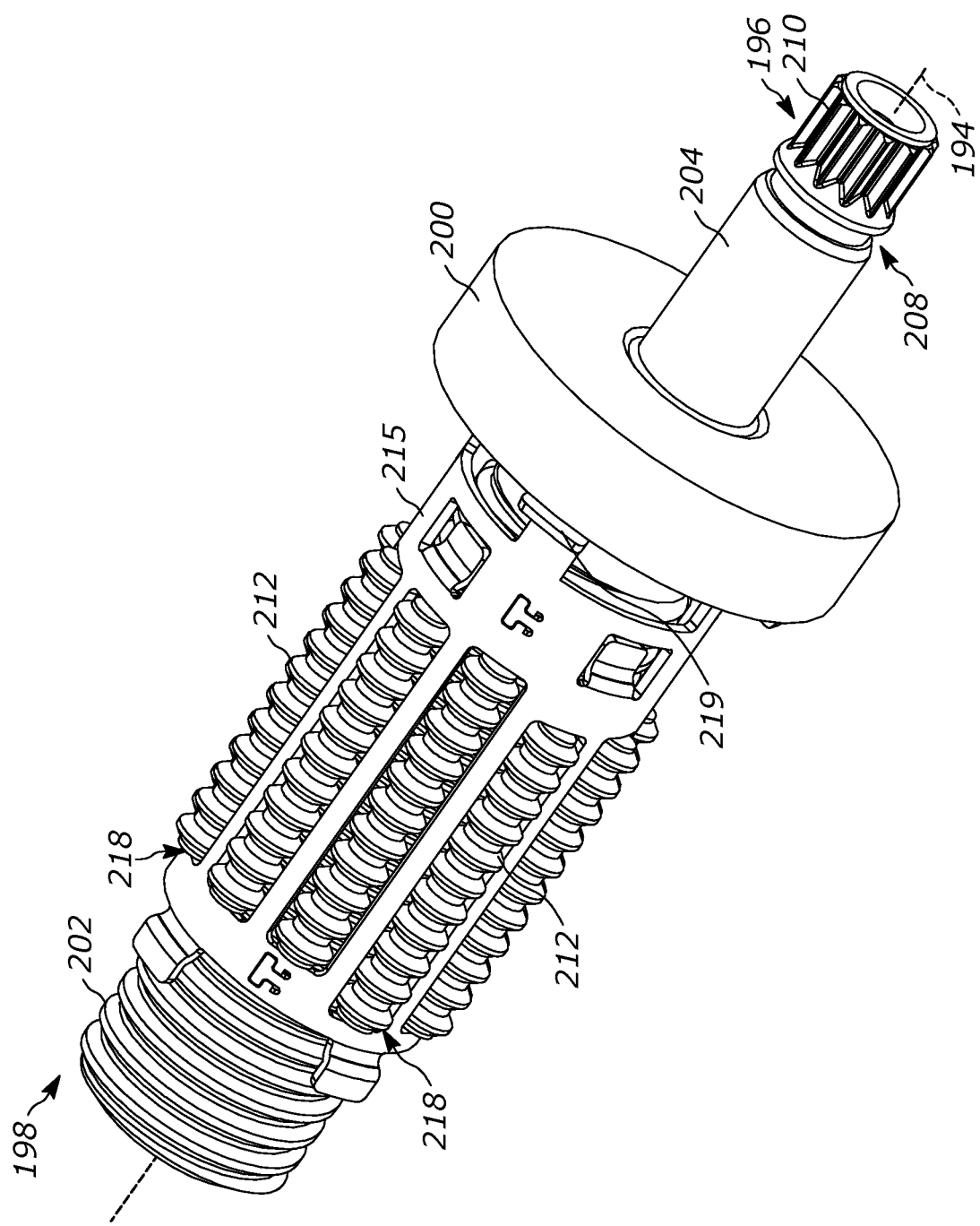
FIG. 3B is an enlarged view of a portion of the piston assembly for the caliper.

For illustrative purposes, and referring to FIGS. 3A-3B, the piston assembly 100 is configured as a planetary roller screw. With this in mind, the piston 102 is provided in the passage 80 in the housing 70 in a manner that prevents relative rotational movement therebetween but allows for relative axial movement. In one example, the piston 102 is keyed to the housing 70 with lobes, splines or flats (not shown). Alternatively/additionally, a high interference piston rubber seal (not shown) can be provided between the piston 102 and housing 70.

The piston 102 extends along a centerline 104 from a first end 106 to a second end 108. An inner surface 109 defines a cavity 110 extending from the first end 104 towards the second end 108. The cavity 110 terminates at a stepped inner surface 112. The piston 102 is formed from a material that is durable in both compression and tension, such as steel, aluminum or the like.

A nut 130 is provided in the cavity 110 of the piston 102. The nut 130 includes a base 132 and a flange 134 extending radially outward from the base. The flange 134 includes a peripheral surface 136 that engages the inner surface 109 of the piston 102. In one example, the flange 134 is substantially square with planar corners such that the surfaces 109, 136 engage one another at four discrete locations and thereby prevent relative rotation between the nut 130 and the piston 102. It will be appreciated that the flange 134 can have alternative configurations.

In any case, the flange 134 is configured to mate with the inner surface 109 in a manner that prevents relative rotation between the spindle 192 and the piston 102 but allows for relative axial movement, e.g., sliding relative movement. A central passage 140 extends the entire length of the nut 130 through the base 132 and the flange 134. Threads 142 are provided along the central passage 140.

The spindle assembly 190 includes a spindle 192 extending along an axis 194 from a first end 196 to a second end 198. A projection or flange 200 extends radially from the spindle 192 between the first and second ends 196, 198. External threads 202 are provided from adjacent the flange 200 to the extent of the second end 198. An unthreaded portion 204 extends from the flange 200 towards the first end 196 and terminates at an annular recess 208. A splined portion 210 extends from the annular recess 208 to the extent of the first end 196. A thrust bearing 214 is received by the unthreaded portion 204 and abuts the flange 200. A retaining ring (not shown) is configured to snap into the recess 208 on the first end 196 of the spindle 192 at a location outside the passage 80 in order to fix the axial position of the spindle therein.

When the piston assembly 100 is assembled, the spindle 192 extends entirely through the passage 140 in the nut 130 to a location adjacent the inner surface 112. The threads 202 on the spindle 192 are generally concentric with the threads 142 on the nut 130. The flange 200, the unthreaded portion 204, and the splined portion 210 are positioned outside the piston 102.

Referring further to FIG. 3B, roller screws 212 are arranged circumferentially around the spindle 192 and threadably engage both the threads 202 on the spindle and the threads 142 on the nut 130. A tubular cage 215 ensures circumferential and longitudinal alignment between the roller screws 212. To this end, the cage 215 is positioned over the threads 202 on the spindle 192 and includes radially extending openings 218 that receive the roller screws 212. The openings 218 are configured such that the roller screws 212 are symmetrically arranged in the circumferential direction about the axis 194. Each roller screw 212 also has a longitudinal position along the axis 194 as defined by the thread helix of the spindle 192. The cage 215 includes a radially extending flange 219 that is held between the nut 130 and the flange 200 (see FIG. 3A).

Due to this construction, when the spindle 192 rotates about the axis 194 in, for example, the direction $R_1$, the roller screws 212 rotate between the spindle and the nut 130 while the cage 215 prevents the roller screws from moving circumferentially relative to each other and ensures the roller screws remain equally spaced from each other. The spindle 192 is fixed in its axial position relative to the housing 70 and, thus, the rotating roller screws 212 cause the nut 130 to move axially in the direction D towards the piston 102.

Ultimately, the nut 130 engages the piston 102 and moves the piston in the direction D into engagement with the brake pad 37. The mating/keyed connection between the nut 130 and piston 102 prevents relative rotational movement therebetween during axial movement of the nut. Furthermore, as noted, the piston 102 is prevented from rotation relative to the housing 70, with the resistance to relative rotation being increased due to contact friction between the piston and the back of the brake pad. That said, torque may be increased and decreased at the spindle 192 to increase and respectively decrease clamp force on the rotor 36, 38. In any case, it will be appreciated that the spindle 192 could likewise be rotated in a direction opposite the direction $R_1$ (not shown) in order to cause axial movement of the piston 102 in the direction D.

It will be appreciated that while the piston assembly 100 shown includes a piston 102, nut 130, and spindle 192 other configurations are contemplated. For example, the piston 102 and nut 130 can be formed as a single, unitary component; the piston can be omitted such that the nut acts directly on the brake pad 37 or the nut can be omitted and the spindle threadably engaged with threads on the inner surface 109 of the piston. Consequently, in some situations the nut 130 acts as a piston for applying braking force to the brake pad 37. That said, the roller screws 212 can be omitted in certain configurations. It will therefore be appreciated that any reference to a "piston" encompasses any of the aforementioned configurations.

Figure 4A:
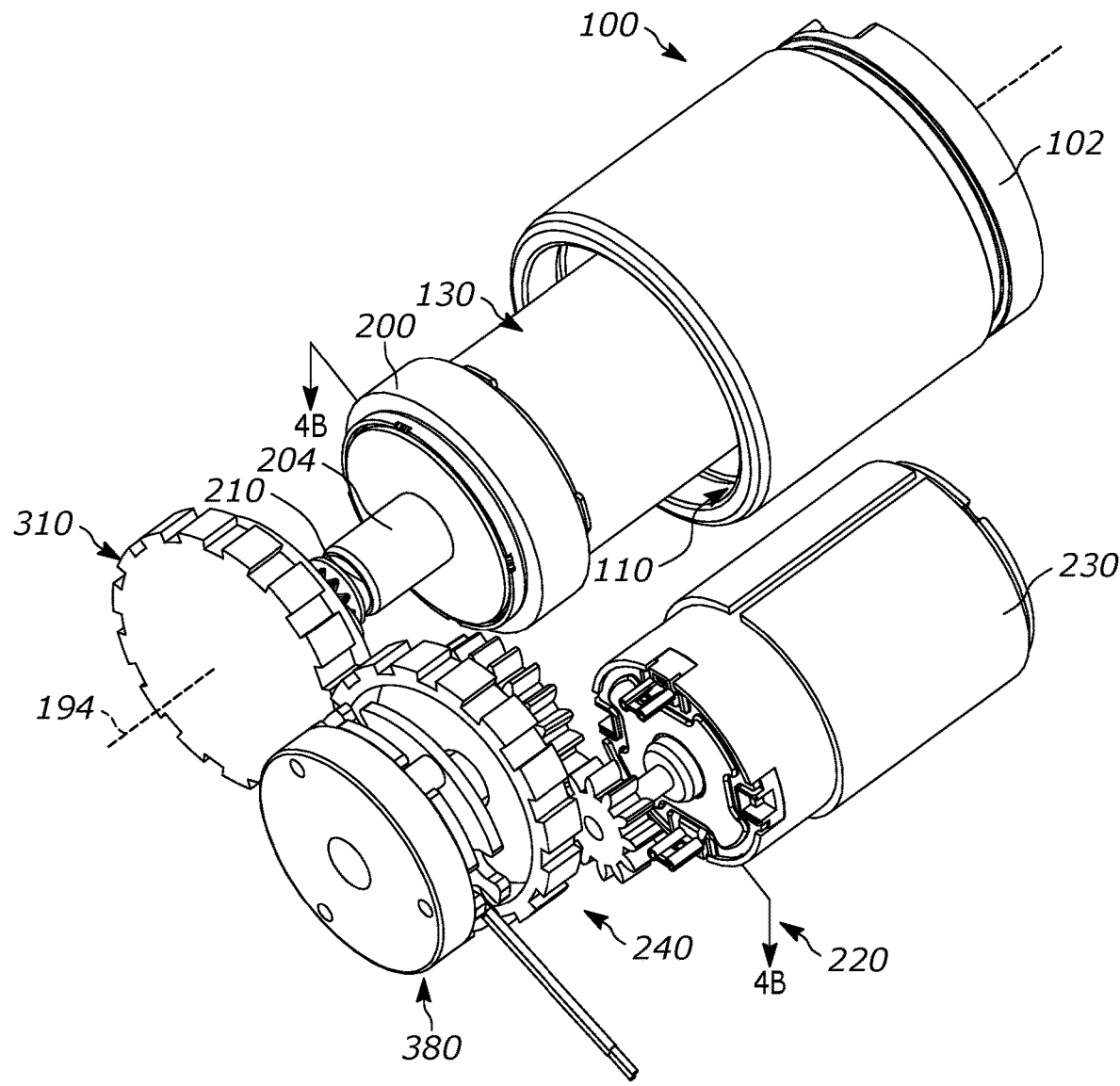
FIG. 4A is a front view of a drive assembly for the caliper.
Figure 4B:
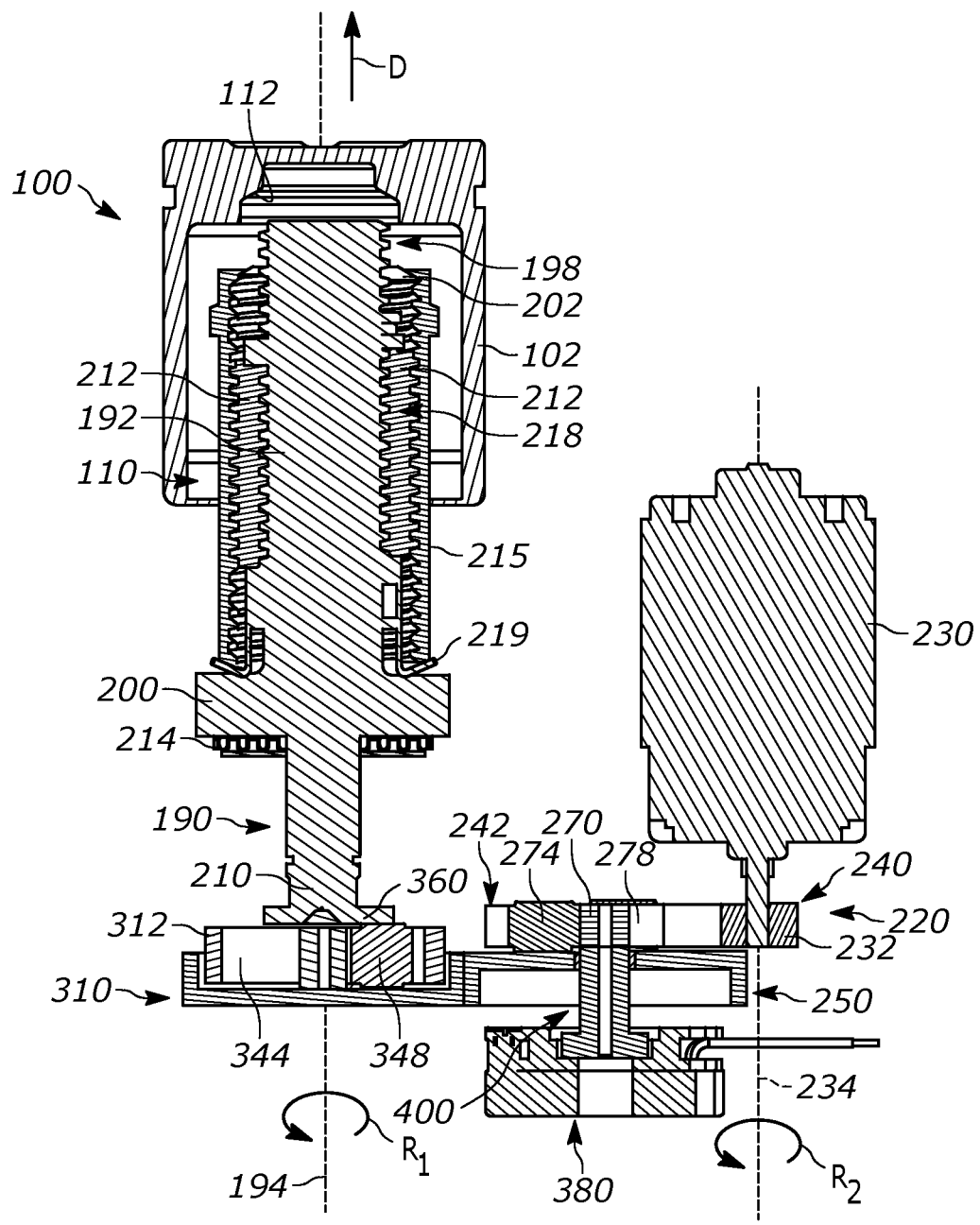
FIG. 4B is a section view taken along line 4B-4B of FIG. 4A.

Turning to FIGS. 4A-4B, the drive assembly 220 includes a motor 230 having a first gear stage 232, a gear train including a second gear stage 240 and a third gear stage 310, and a coupling mechanism 380. The first gear stage constitutes a gear 232 rotatable about an axis 234 in the direction $R_2$ (and a direction opposite the direction $R_2$) and coupled to the second gear stage 240. The direction $R_2$ can be the same as or different from the direction $R_1$. In one instance, the motor 230 is a brushless DC (BLDC) motor.

The second and third gear stages 240, 310 can be formed as planetary gear stages. It will be appreciated that the gear train can include more or fewer gear stages. In any case, the drive assembly 220 is configured to selectively couple the second and third gear stages 240, 310 to one another to thereby selectively allow the motor 230 to supply torque to the spindle 192.

Figure 5:
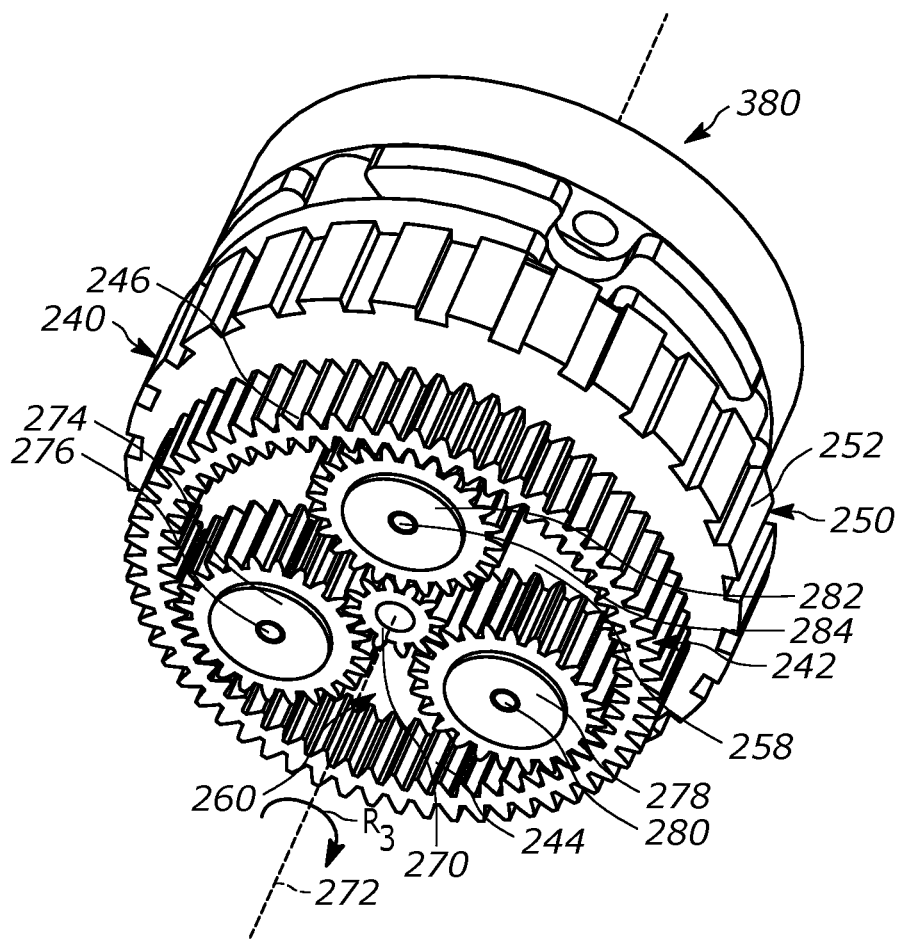
FIG. 5 is a bottom view of a first gear stage and coupling mechanism of the drive assembly.
Figure 6:
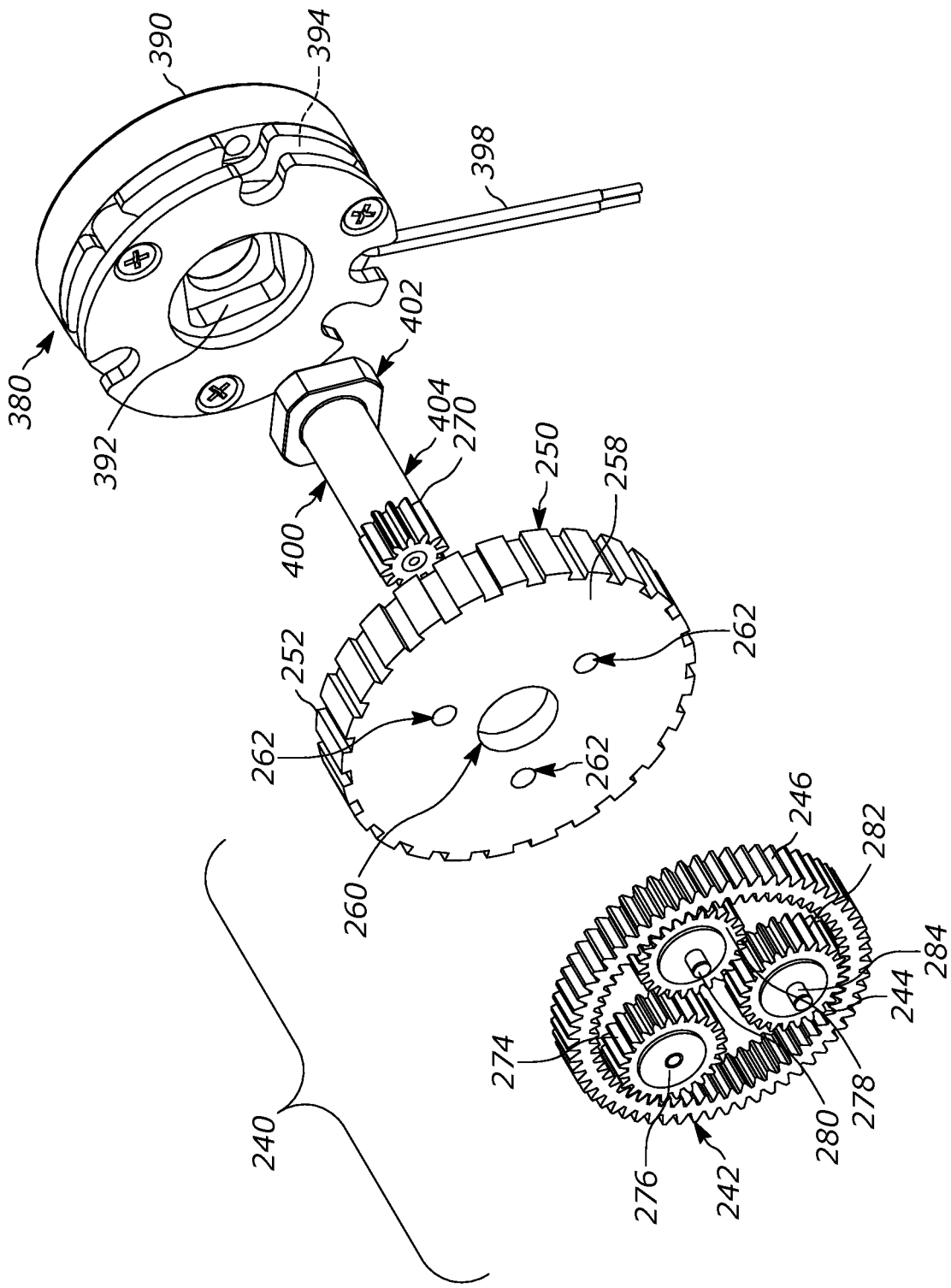
FIG. 6 is an exploded view of FIG. 5.

As shown in FIGS. 5-6, the second gear stage 240 includes a ring gear 242 and a carrier gear 250 concentrically arranged with the ring gear. The ring gear 242 includes interior teeth 244 and exterior teeth 246. The exterior teeth 246 mesh with the gear 232 of the motor 230. The carrier gear 250 includes exterior teeth 252 and an axial surface 258. A central passage 260 extends through the carrier gear 250. Holes 262 are circumferentially arranged about the central passage 260. The ring gear 242 is positioned on the axial surface 258 and centered about the central passage 260.

A sun gear 270 is aligned with the central passage 260 and positioned within the ring gear 242 for rotation about an axis 272. Planetary gears 274, 278, 282 are arranged about the sun gear 270, and are in meshed engagement with both the sun gear and the interior teeth 244 of the ring gear 242. The planetary gears 274, 278, 282 are supported for rotation by respective axles 276, 280, 284 which can be press-fit into holes or openings 262 in the carrier gear 250.

The coupling mechanism 380 can be configured as an electromagnetic brake including a housing 390 defining a central passage 392. An electromagnet 394 is provided in the housing 390 and encircles the passage 392. The electromagnet 394 includes a first disc made of a friction material, a second disc made of a magnetic material, and a coil electrically connected to a power source, e.g., the vehicle battery 42, via wires 398. The first disc abuts the housing 390 and encircles the passage 392. The second disc also encircles the passage and is spring-biased into engagement with the first disc to pin/fix the first disc against the housing 390 and prevent rotation of the first disc.

The coupling mechanism 380 further includes a shaft 400 extending from a first end 402 to a second end 404. The first end 402 has a polygonal shape and extends into the passage 392. The second end 404 is secured to or integrally formed with the sun gear 270 such that the second end and sun gear are rotatable together in the direction $R_3$.

When the coil of the electromagnet 394 is energized, the second [magnetic] disc compresses the springs to move out of engagement with the first disc, which is now free to rotate with the shaft 400. With this in mind, the coupling mechanism 380 is configured such that selectively applying current to the electromagnet 394 either allows or prevents rotation of the shaft 400 relative to the housing 390, which allows or prevents rotation of the sun gear 270 about the axis 272. In one example, the coupling mechanism 380 acts as a solenoid brake, e.g., a normally locked, spring-loaded brake, for selectively allowing and preventing rotation of the sun gear 270.

To this end, the coupling mechanism 380 has a first condition in which the shaft 400 is held/prevented from rotating relative to the housing 410 and a second condition in which the shaft is permitted to rotate relative to the housing 410. In one example, the coupling mechanism 380 is electrically deactivated or unpowered when in the first condition and electrically activated or powered when in the second condition.

It will be appreciated that the coupling mechanism 380 could alternatively be configured so as to be activated/powered when in the first condition and deactivated/unpowered when in the second condition. It will also be appreciated that the coupling mechanism 380 can have intermediate conditions between the first and second conditions in which quick ON and OFF pulses of electricity achieves, on average, an intermediate level of current applied to the electromagnet 394 that hinders—but does not prevent—rotation of the shaft 400. Such quick ON then OFF pulses of electricity is also called Pulse Width Modulation, or PWM. In any case, the coupling mechanism 380 and the motor 230 are independently actuatable from one another.

Figure 7:
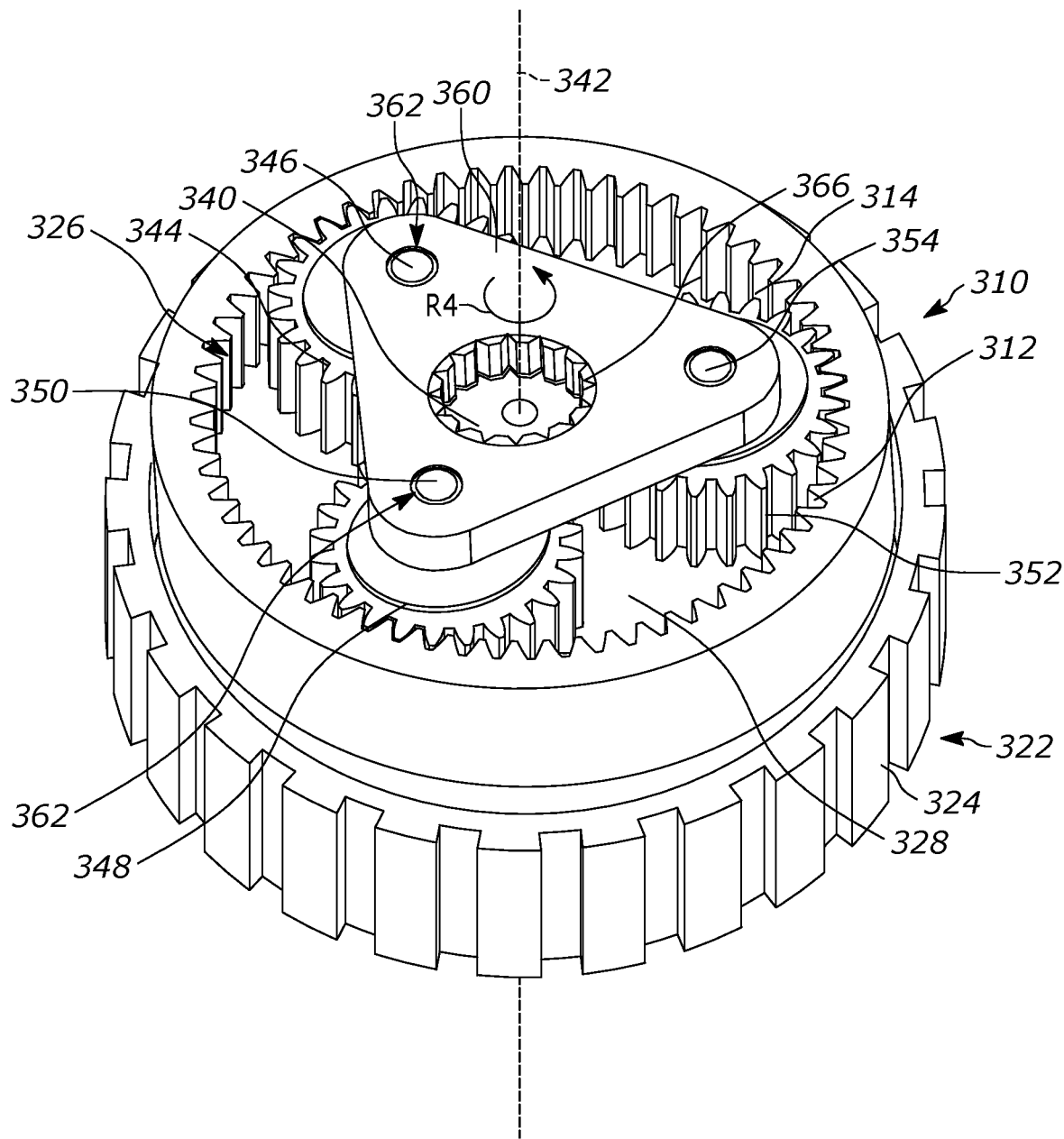
FIG. 7 is a bottom view of a second gear stage of the drive assembly.

As shown in FIG. 7, the third gear stage 310 includes a ring gear 312 and a two stage gear 322 concentrically arranged with the ring gear. The ring gear 312 is fixed to the interior of the housing 222 and includes interior teeth 314. The two stage gear 322 includes exterior teeth 324 and a central passage 326 that extend to an inner surface 328. A sun gear 340 is integrally formed with and extends from the inner surface 328 such that the sun gear and exterior teeth 324 cooperate to define the two stage gear, which is rotatable about an axis 342. The ring gear 312 is positioned with a minimal gap to the inner surface 328 and centered within the central passage 326.

Planetary gears 344, 348, 352 are arranged about the sun gear 340 in meshed engagement with both the sun gear 340 and the interior teeth 314 of the ring gear 312. The planetary gears 344, 348, 352 rotatably supported by respective axles 346, 350, 354 extending therethrough. The axles 346, 350, 354, in turn, can be press-fit in holes or openings 362 in a carrier 360. The carrier 360 includes a splined inner surface 366 that mates with the splined portion 210 of the spindle 192 (not shown).

Figure 8:
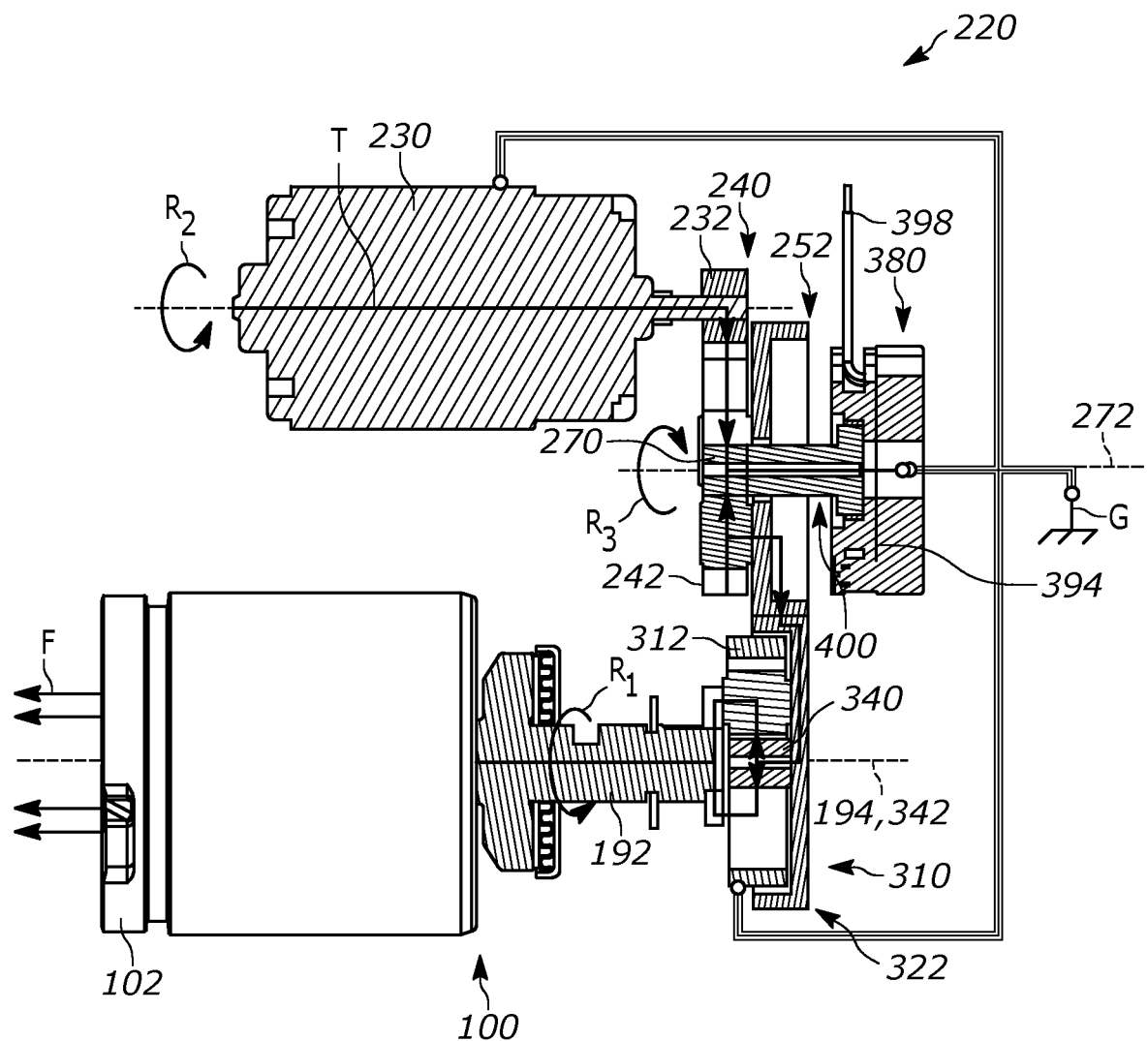
FIG. 8 is a schematic illustration of a braking operation with the coupling mechanism in a first condition.

Turning to FIG. 8, during operation of the braking system 10, a service brake apply demand is initiated by the system and/or vehicle operator. In this example, service braking is shown for a single, rear end 26 wheel rotor 38. In response to the demand, the control system 44 actuates the motor 230 to rotate the gear 232 in the direction $R_2$, which results in rotation of the ring gear 242 of the second gear stage 240 in the direction $R_3$.

At this time, the coupling mechanism 380 is in the first condition in which no power is supplied to the electromagnet 394 and, thus, the shaft 400 and sun gear 270 are fixed against rotation (shown schematically at ground G). In other words, the deactivated or first condition of the coupling mechanism 380 is the default/initial condition. Consequently, the rotating ring gear 242 rotates the planetary gears 274, 278, 282 about their respective axles 276, 280, 284 while collectively revolving the planetary gears about the sun gear 270 in the direction $R_3$. The rotating planetary gears 274, 278, 282 therefore orbit the fixed sun gear 270.

The carrier gear 250—being fixed to the planetary gears 274, 278, 282—rotates therewith in the direction $R_3$, causing the two stage gear 322 and thus the sun gear 340 of the third gear stage 310 to rotate in the direction $R_1$ about the axes 194, 342. This, in turn, causes the sun gear 340 secured to the two stage gear 322 to rotate in the direction $R_1$.

Since the ring gear 312 is fixed in place, rotating the sun gear 340 rotates the planetary gears 344, 348, 352 about their axles 346, 350, 354 while causing the carrier 360 secured thereto to rotate in the direction $R_1$. As a result, the rotating planetary gears 344, 348, 352 orbit or revolve about the rotating sun gear 340 of the two stage gear 322. The rotating carrier 360 rotates the spindle 192 in the direction $R_1$ via the splined connection 210, 366, which causes the piston 102 to apply a braking force F to the brake pad 37.

That said, rotating the motor 230 while the coupling mechanism is in the first condition enables the gear stages 240, 310 to transfer torque from the motor to the spindle 192 in order to move the piston 102 in the direction D towards and into engagement with the brake pad 37. Consequently, the service brake is applied and the bridge 92 of the housing 70 elastically deforms in a known manner to create clamp force on the rotors 36, 38. The flow of torque through the system during braking is indicated generally by the arrow T in FIG. 8.

A situation may arise in which it is desirable to reduce the braking force F on the brake pad(s) 37 temporarily, e.g., an emergency situation/event (such as ABS braking and/or ESC braking) or a drive away release (DAR) situation (such as from a standstill on a steep incline/decline). In such situations, it is advantageous to quickly and temporarily release/reduce the braking force F in a manner that helps to prevent wheel lock while allowing the braking force to be quickly and easily re-applied.

Figure 9:
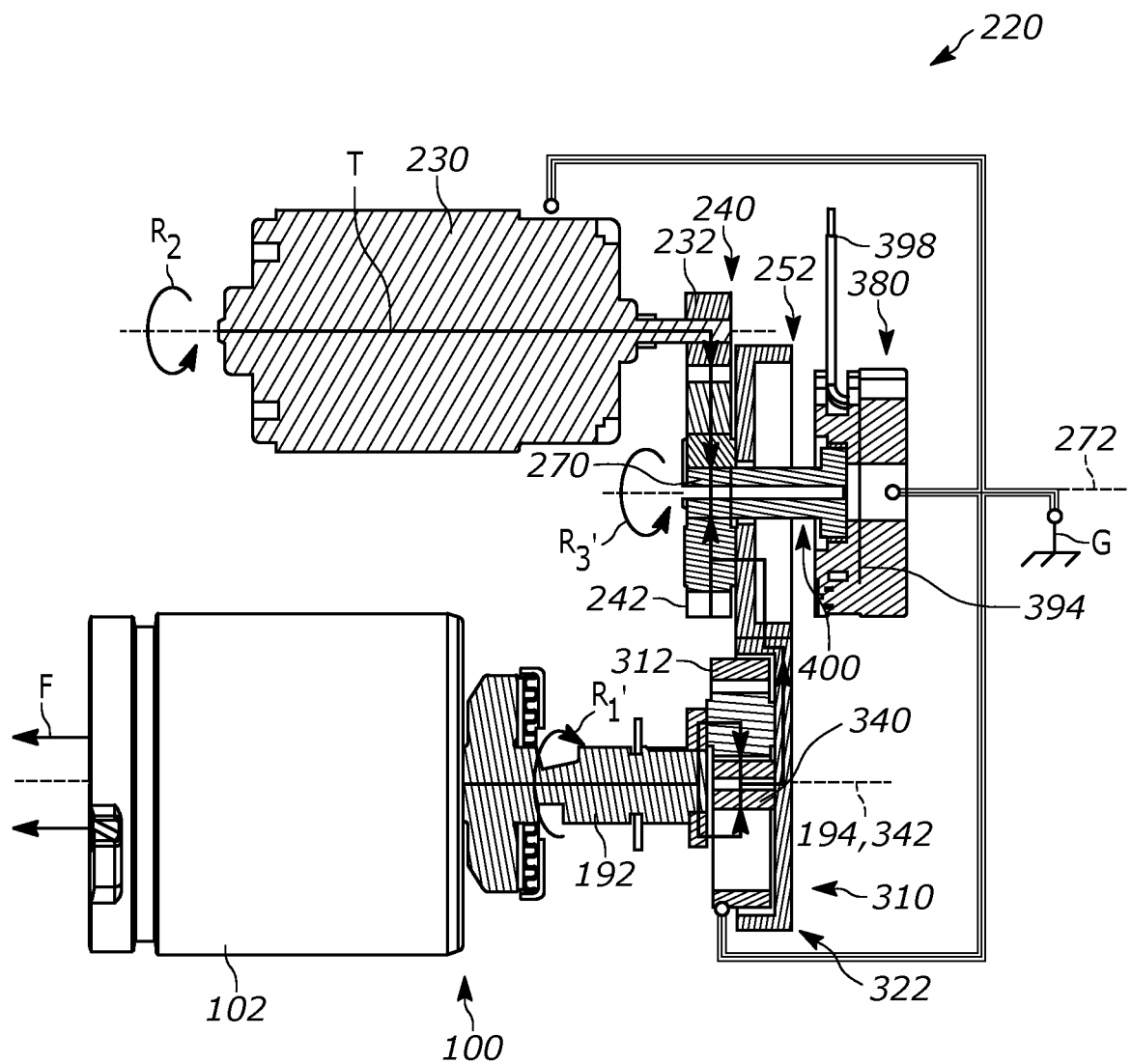
FIG. 9 is a schematic illustration of a braking operation with the coupling mechanism in a second condition.

With this in mind, and turning to FIG. 9, when it is desirable to quickly release/reduce the braking force F from the brake pad 37, the control system 44 activates the coupling mechanism 380. Activating the coupling mechanism 380 can be in response to, for example, signals received from one or more of the sensors 50, 52, 58 indicating the emergency or DAR event. In any case, activating the coupling mechanism 380 supplies current through the wires 398 to the electromagnet 394. This releases the shaft 400 from the housing 390 and allows for rotation of the shaft—and therefore the sun gear 270 secured thereto—about the axis 272. Due to the connection between the gear stage stages 240, 310, allowing the sun gear 270 to rotate decouples the motor 230 from the spindle 192. In other words, activating the coupling mechanism 380 prevents the motor 230 from supplying torque to the spindle 192.

More specifically, when the sun gear 270 is allowed to rotate, the planetary gears 274, 278, 282 will orbit the sun gear 270 at a speed dependent on the rotation speed of the ring gear 242 and the two stage gear 322. That said, the planetary gears 274, 278, 282 are free to orbit the sun gear 270 when the sun gear 270 rotates, as necessary to allow torque to be released from the rotating spindle 192. Consequently, torque from the rotating motor 230 is not transferred to the carrier gear 252 but instead to the now freely rotating shaft 400. Accordingly, the motor 230 no longer supplies torque to the spindle 192 and, thus, the piston 102 is no longer urged in the direction D towards the brake pad 37.

This allows the elastically deformed bridge 92, housing 70, and pad 37 to automatically relax and back drive the piston 102 towards the passage 80 in the direction opposite the direction D. The spindle 192 is free to rotate in a direction $R_1'$ opposite the direction $R_1$ to accommodate the retracting movement of the piston 102. The piston 102 retraction reduces the applied braking force F compared to the brake apply operation. The brake force F can be reduced a predetermined amount, including up to removing the braking force entirely.

The retracting piston 102 causes torque T to flow in reverse through the gear stages 240, 310, ultimately causing the carrier gear 252 to rotate in a direction $R_3'$ opposite the direction $R_3$. The coupling mechanism 380 can remain in the second condition until it is desirable to reapply the initial/full braking force F on the pad 37. All of this occurs without having to deactivate or stop rotation of the motor 230.

It will be appreciated that if the coupling mechanism 380 is placed in the second condition in response to an emergency braking situation, the motor 230 is still rotatable (and in fact can continue rotating) in the direction $R_2$. If the coupling mechanism 380 is placed in the second condition in response to a DAR event, the motor 230 is still rotatable but can be turned off. In either case, placing the coupling mechanism 380 in the second condition does not lock or prevent rotation of the motor 230 but rather disables torque transmission from the motor to the spindle 192.

The control system 44 can return the coupling mechanism 380 back to the first condition in response to, for example, signals from the wheel speed sensors 58 indicating that wheel slip is no longer occurring. Returning the coupling mechanism 380 to the first condition locks the shaft 400/sun gear 270 in place, i.e., re-establishes the connection to ground G, thereby allowing the second gear stage 240 to transmit torque from the rotating motor 230 to the third gear stage 310 and ultimately to the spindle 192.

In the case of an emergency event, the control system 44 can repeatedly alternate the coupling mechanism 380 back-and-forth between the first and second conditions to rapidly advance/retract the piston 102 against the brake pad 37 without deactivating/stopping the motor 230 or reversing the rotation direction of the motor. This advantageously makes application of the brake during emergency situations more efficient.

It will be appreciated that rotation of the motor 230 can be precisely controlled using pulse width modulation (PWM). For example, the degree and/or rate of braking force F on the pad 37 during braking can be finely tuned as well as the degree and/or rate of braking force reduction during an ABS event. The control system 44 can rely on signals from any of the sensors indicating, for example, road surface conditions, in controlling PWM.

Once the emergency or DAR event is over, the control system 44 can rotate the motor 230 in a direction opposite the direction shown at $R_2$ while the coupling mechanism 380 is in the first condition in order to fully retract the piston 102.

Based on the foregoing, it is clear that the drive assembly of the present invention allows for the motor to rotate in a single direction during both brake apply and release by simply using the coupling mechanism to alter how the planetary gear stages interact with one another. This is advantageous because allowing the motor to operate in a single direction reduces the overall current draw during an emergency operation. In other words, the additional current that is usually required to slow down, stop, and reverse the torque-supplying motor during emergency operations is now eliminated.

Furthermore, the current needed to operate the coupling mechanism in the activated condition is substantially less than the current required to change the motor rotation direction. Additionally, the cycle time for applying and releasing/reducing the braking force is much less in the present invention because the aforementioned motor stopping/reversing can be avoided, and the time required to activate or deactivate the coupling mechanism is minimal.

Moreover, since the coupling mechanism operates independent of the piston assembly, the coupling mechanism can be readily implemented into any piston-spindle construction, e.g., ball screw assembly, ball ramp, ball nut or any other high-efficiency piston assembly. A fast-lead connection between the spindle and the nut in the case of ball ramp constructions can further reduce application/release times due to the relatively lower apply torques required to move the nut.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An electric brake for a wheel rotor having a brake pad associated therewith, comprising:
   a housing defining a passage;
   a piston assembly provided in the passage and including a spindle and a piston aligned with the brake pad, the spindle being rotatable to cause the piston to move axially relative to the brake pad; and
   a drive assembly comprising:
      a motor;
      a gear train for transferring torque between the motor and the spindle;
      a coupling mechanism coupled to the gear train and having a first condition locking a portion of the gear train against rotation for enabling torque transmission from the motor to the spindle for axially moving the piston to apply braking force to the brake pad, the coupling mechanism having a second condition permitting rotation of the portion of the gear train for disabling torque transmission from the motor to the spindle which permits the piston to retract and reduce the braking force on the brake pad without stopping or reversing the motor.

2. The electric brake of claim 1, wherein the coupling mechanism comprises a solenoid brake coupled to a geared shaft that is an integral part of the gear train.

3. The electric brake of claim 2, wherein the solenoid brake prevents rotation of the geared shaft when in the first condition.

4. The electric brake of claim 2, wherein the solenoid brake permits rotation of the geared shaft when in the second condition.

5. The electric brake of claim 1, wherein the coupling mechanism is placed in the first and second conditions in an alternating manner while rotating the motor in the same direction to perform an ABS event when wheel slip is detected.

6. The electric brake of claim 1, wherein the coupling mechanism is placed in the first and second conditions in an alternating manner while rotating the motor in the same direction to perform an ESC event when loss of vehicle control is detected.

7. The electric brake of claim 1, wherein the coupling mechanism is placed in the second condition in response to a drive away release event.

8. The electric brake of claim 1, wherein the gear train comprises a first planetary gear stage and a second planetary gear stage.

9. The electric brake of claim 8, wherein the coupling mechanism comprises a solenoid brake and a shaft secured to and rotatable with a sun gear of the first planetary gear stage.

10. The electric brake of claim 9, wherein the spindle is secured to and movable with planetary gears of the second planetary gear stage.

11. The electric brake of claim 1, further comprising a nut provided between the spindle and the piston and coupled to the spindle by roller screws.

12. An electric brake for a wheel rotor having a brake pad associated therewith, comprising:
    a housing defining a passage;
    a piston assembly provided in the passage and including a spindle and a piston aligned with the brake pad, the spindle being rotatable to cause the piston to move axially relative to the brake pad; and
    a drive assembly comprising:
       a motor;
       planetary gear stages for connecting the motor to the spindle;
       a solenoid brake including a shaft coupled to one of the planetary gear stages and having a first condition preventing rotation of the shaft which enables torque transmission from the motor to the spindle for axially moving the piston to apply braking force to the brake pad, the solenoid brake having a second condition permitting rotation of the shaft which disables torque transmission from the motor to the spindle to permit the piston to retract and reduce the braking force on the brake pad.

13. The electric brake of claim 12, wherein the solenoid brake prevents rotation of the shaft when in the first condition.

14. The electric brake of claim 12, wherein the solenoid brake permits rotation of the shaft when in the second condition.

15. The electric brake of claim 12, wherein the solenoid brake is placed in the first and second conditions in an alternating manner while rotating the motor in a single direction to perform an ABS event when wheel slip is detected.

16. The electric brake of claim 12, wherein the solenoid brake is placed in the first and second conditions in an alternating manner while rotating the motor in a single direction to perform an ESC event when loss of vehicle control is detected.

17. The electric brake of claim 12, wherein the solenoid brake is placed in the second condition in response to a drive away release event.

18. The electric brake of claim 12, wherein the planetary gear stages comprise first and second planetary gear stages, the shaft being secured to and rotatable with a sun gear of the first planetary gear stage and the spindle being secured to and movable with planetary gears of the second planetary gear stage.

19. A method of applying an electric brake to a wheel rotor having a brake pad, comprising the steps of:
   providing a housing having a movable piston assembly therein including a spindle and a piston aligned with the brake pad, the spindle being rotatable about an axis to cause the piston to move axially relative to the brake pad;
   rotating a motor to supply torque to the spindle through a gear train for axially moving the piston to apply braking force to the brake pad; and
   actuating a coupling mechanism connected to the motor and laterally offset from the axis of the spindle to enable rotation of a portion of the gear train for disabling torque transmission from the motor to the spindle which permits the piston to retract and reduce the braking force on the brake pad without stopping or reversing the motor.

20. The method of claim 19, wherein the coupling mechanism is actuated in response to detecting one of an emergency event and a drive away release event.

21. The electric brake of claim 9, wherein the sun gear constitutes the portion of the gear train that is locked against rotation for enabling torque transmission from the motor to the spindle.

22. The electric brake of claim 1, wherein the motor is rotatable in a first direction while the coupling mechanism is in the first condition to axially move the piston to apply braking force to the brake pad, the motor being rotatable in the first direction while the coupling mechanism is in the second condition to retract and reduce the braking force on the brake pad.

23. The method of claim 19, wherein the motor is rotated in a first direction to apply braking force to the brake pad and rotated in the same first direction while the coupling mechanism is actuated to retract and reduce the braking force on the brake pad.

* * * * *